(12) United States Patent
Hung et al.

(10) Patent No.: US 7,218,064 B2
(45) Date of Patent: May 15, 2007

(54) COLD CATHODE FLAT FLUORESCENT LAMP AND DRIVING METHOD THEREFOR

(75) Inventors: Jin-Chyuan Hung, Hsinchu (TW); Chang-Chun Hsiao, Yunlin County (TW); Chuan-Chi Hsu, Yunlin County (TW); Kung-Tung Pan, Taichung (TW); Yui-Shin Fran, Hsinchu (TW)

(73) Assignee: Delta Optoelectronics, Inc., Hsinchu (TW)

( * ) Notice: Subject to any disclaimer, the term of this patent is extended or adjusted under 35 U.S.C. 154(b) by 0 days.

(21) Appl. No.: 11/274,353

(22) Filed: Nov. 15, 2005

(65) Prior Publication Data
US 2006/0181223 A1     Aug. 17, 2006

(30) Foreign Application Priority Data
Feb. 16, 2005     (TW) ............................. 94104562 A

(51) Int. Cl.
*G05F 1/00* (2006.01)
(52) U.S. Cl. .................. 315/291; 315/209 R; 315/276; 315/DIG. 5
(58) Field of Classification Search ................ 315/291, 315/209 R, 247, 276, 224–226, 283, DIG. 5, 315/307–308
See application file for complete search history.

(56) References Cited

U.S. PATENT DOCUMENTS

| 5,416,387 | A | * | 5/1995 | Cuk et al. ................ 315/209 R |
| 5,666,031 | A | * | 9/1997 | Jennato et al. .............. 315/246 |
| 5,939,830 | A | * | 8/1999 | Praiswater ............... 315/169.3 |
| 2002/0195971 | A1 | * | 12/2002 | Qian et al. .................. 315/224 |
| 2004/0113569 | A1 | * | 6/2004 | Henry ........................ 315/307 |
| 2006/0038513 | A1 | * | 2/2006 | Henry ........................ 315/291 |
| 2006/0119285 | A1 | * | 6/2006 | Gray .......................... 315/224 |

* cited by examiner

*Primary Examiner*—Thuy V. Tran
*Assistant Examiner*—Tung Le
(74) *Attorney, Agent, or Firm*—Volpe and Koenig, P.C.

(57) ABSTRACT

A cold cathode flat fluorescent lamp and a driving method for a cold cathode flat fluorescent lamp are provided. The cold cathode flat fluorescent lamp includes a lamp, a transformer and a full-bridge circuit. The lamp has at least a first electrode having a first voltage and a second electrode having a second voltage. The transformer has a primary side and a secondary side, and the full-bridge circuit is used for driving the lamp. In addition, the transformer is connected to the lamp on the secondary side and is connected to the full-bridge circuit on the primary side.

25 Claims, 8 Drawing Sheets

COLD CATHODE FLAT FLUORESCENT LAMP AND DRIVING METHOD THEREFOR

FIELD OF THE INVENTION

The present invention relates to a cold cathode fluorescent lamp and the driving method therefor, and more particularly to the cold cathode fluorescent lamp applied in the backlight liquid crystal display (LCD) and the driving method therefore. However, the present cold cathode fluorescent lamp is not limited to be just applied in the backlight LCD, it's also applied in other fields, such as the advertisement illumination and emergency illumination.

BACKGROUND OF THE INVENTION

Recently, since the manufacturing technology for the LCD has gradually become mature, and, meanwhile, all the main manufacturers in the world have invested a lot of time and money in the relevant studies and used large-scale instruments, the qualities of the LCD have been substantially improved. Since the liquid crystal television has become the leading role in the tide of applying the digital electric instruments, it is the most expected and has the most market potential in the applications of the LCD.

The LCD is not a displaying system with self-illumination, so that it always needs an additional light source device, such as the backlight module. In general, the backlight module includes a plurality of cold cathode lamps, so that the backlight module must have the thick diffusers and the thickness thereof is not easily reduced. In addition, since the conventional backlight module has a plurality of lamps, its operation temperature is always high. Besides, the decay rate of each lamp is always accelerated due to the long operation period under the high operation temperature and high illumination. However, the most serious problem is that the decay rate of each lamp is different from others, so that, after a long period of operation, the illumination of the backlight module will become uneven. In order to solve the above possible drawback, the backlight module with flat lamps was provided.

Please refer to FIG. 1, which shows a diagram of the conventional cold cathode flat fluorescent lamp (CCFFL). As shown in FIG. 1, the cold cathode flat fluorescent lamp 10 includes the upper glass plate 11, the lower glass plate 12, the metal electrodes 13 and 14, the insert gas molecules (not shown), and the phosphor powder (not shown). The metal electrodes 13 and 14 can be provided on the external of the cold cathode flat fluorescent lamp to form an external electrode cold cathode flat fluorescent lamp.

The light emitting principle of the cold cathode flat fluorescent lamp 10 is described as follows. A voltage difference is provided between the metal electrodes 13 and 14 so as to make the metal electrodes 13 and 14 absorb or emit electrons. The electrons will hit the insert gas molecules to excite them into the plasma. When the insert gas molecules are transformed from their excited states back to the stable states, the ultraviolet will be emitted therefrom. After that, the emitted ultraviolet will excite the phosphor powder to generate the visible light.

In traditional, the cold cathode flat fluorescent lamp is driven by a single-pulse voltage, such as that shown in FIG. 2. Please refer to FIG. 2, which is a wave diagram of the conventional single-pulse voltage and the current of the cold cathode flat fluorescent lamp.

As shown in FIG. 2, since only a single voltage is applied to drive the cold cathode flat fluorescent lamp, only a single light will be emitted therefrom. The driving method with a single-pulse voltage has the following defects.

(1). Since the used driving voltage is a single-pulse voltage with constant polarity, the cations and anions separated from the insert gas molecules will attach and accumulate on the metal electrodes to form the accumulated wall charges. The existence of the accumulated wall charges results in that the following driving voltage must be increased so as to obtain the same driving effect. However, the higher driving voltage will cause a higher operation temperature for the cold cathode flat fluorescent lamp and the electric arc for the cold cathode flat fluorescent lamp will become unstable.

(2). Since the used driving voltage of the cold cathode flat fluorescent lamp is usually a high voltage (which is usually higher than 2 kV), the electromagnetic interference (EMI) is always serious. However, the serious EMI of the cold cathode flat fluorescent lamp may result in that the backlight module assembled with the cold cathode flat fluorescent lamp cannot be compliable to the regulations of EMI/EMC thereof.

In order to overcome the defects of the conventional CCFFL, it's an object of the present invention to increase the illumination effect of the CCFFL and to reduce the EMI resulting from the high driving voltage.

In addition, it's another object of the present invention to reduce the situation that the cations and anions always accumulate on the metal electrodes resulting from the driving method with single-pulse voltage for the conventional cold cathode flat fluorescent lamp.

SUMMARY OF THE INVENTION

In accordance with one respect of the present invention, a method for driving a cold cathode flat fluorescent lamp with at least a first electrode having a first voltage and a second electrode having a second voltage is provided. The method includes steps of a) increasing the first voltage to a first increased voltage with a first rate according to the second voltage, b) maintaining the first increased voltage for a first period, c) repeating the steps (a) and (b) at least once to achieve a relatively extreme voltage, d) reducing the relatively extreme voltage with the first rate to a first reduced voltage, e) maintaining the first reduced voltage for the first period, f) repeating the steps (d) and (e) at least once for the first electrode to achieve the first voltage, g) increasing the second voltage to a second increased voltage with a second rate according to the first voltage, h) maintaining the second increased voltage for a second period, i) repeating the steps (g) and (h) at least once to achieve the relatively extreme voltage, j) reducing the relatively extreme voltage with the second rate, k) maintaining the second reduced voltage for the second period and l) repeating the steps (j) and (k) at least once for the second electrode to achieve the second voltage.

Preferably, the first rate and the second rate are equal to or higher than 9.3 V/µs.

Preferably, the first period and the second period are in a range of 0.3 to 2 microseconds.

Preferably, the relatively extreme voltage is 2000 volts.

Preferably, the steps (c) and (i) further comprise a step of increasing the relatively extreme voltage with a voltage difference.

Preferably, the voltage difference is ranged from 50 V to 200 V.

Preferably, the cold cathode flat fluorescent lamp has a driving frequency to be controlled within a range from 25 to 95 kHz.

Preferably, the method further includes a step of adjusting an output of the cold cathode flat fluorescent lamp by controlling a duty of switching-on to switching-off of the first and second voltages.

In accordance with another respect of the present invention, a cold cathode flat fluorescent lamp is provided. The cold cathode flat fluorescent lamp includes a lamp with at least a first electrode having a first voltage and a second electrode having a second voltage, a transformer having a first side and a second side and a full-bridge circuit for driving the lamp with a method according to the present invention. The transformer is connected to the lamp on the first side and is connected to the full-bridge circuit on the second side.

Preferably, the full-bridge circuit is coupled to the transformer via a resonance inductor and a capacitor.

Preferably, the full-bridge circuit is coupled to an input voltage.

Preferably, the full-bridge circuit is made of a metal oxide semiconductor field effect transistor or of an insulated gate bipolar transistor.

Preferably, the cold cathode flat fluorescent lamp further includes a driving frequency to be controlled within a range by the full-bridge circuit.

Preferably, the full-bridge circuit controls a duty of switching-on to switching-off of the first and second voltages so as to adjust an output of the cold cathode flat fluorescent lamp.

In accordance with another respect of the present invention, one concept of the present invention is to provide a voltage wave with the positive and negative polarities on the metal electrodes and provide the pulse voltages with the constant increasing rate or reducing rate, the same maintaining periods but with the opposite phrases. The wall charges accumulated on the metal electrodes will be reduced by applying the multi-level voltages and maintaining the driving voltage on the multi-level voltages for some periods.

In order to increase the self-contained discharge effect, all the voltages with various levels can be continuously increased or reduced so that the voltages of the wall charges on the metal electrodes can be overcome to continuously discharge the lamps and increase the relevant illumination effect.

The foregoing and other features and advantages of the present invention will be more clearly understood through the following descriptions with reference to the drawings, wherein:

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

According to the concepts of the present invention, some features of the present application are described as follows.

(1) The driving voltage has a bipolar feature.

Figure 1:
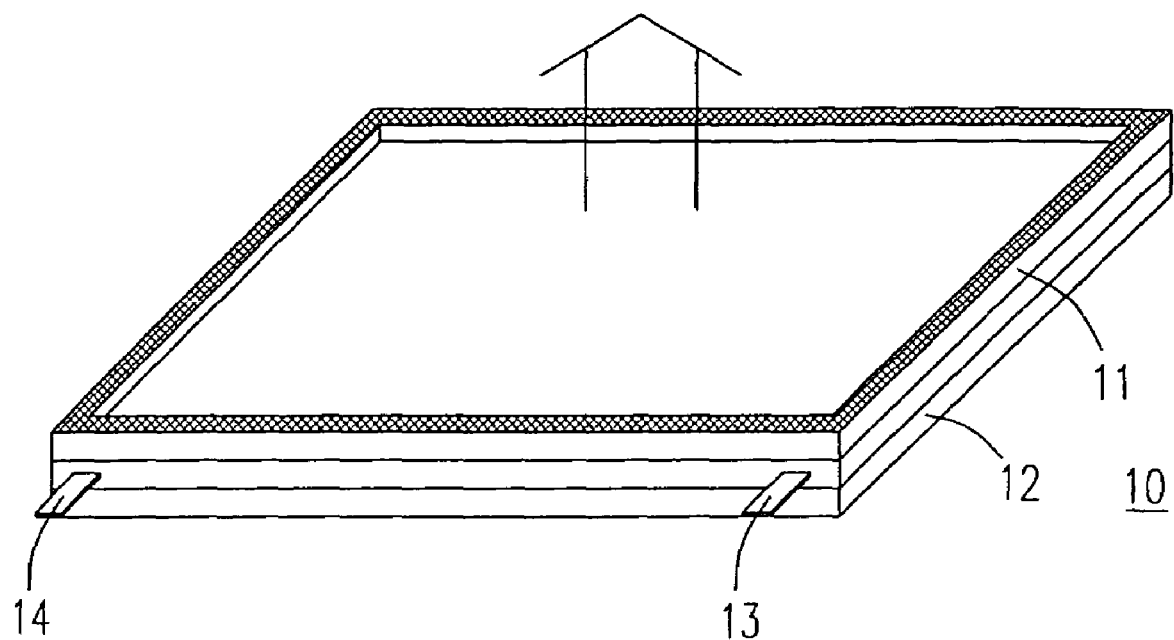
FIG. 1 is a diagram of the conventional cold cathode flat fluorescent lamp (CCFFL)
Figure 2:
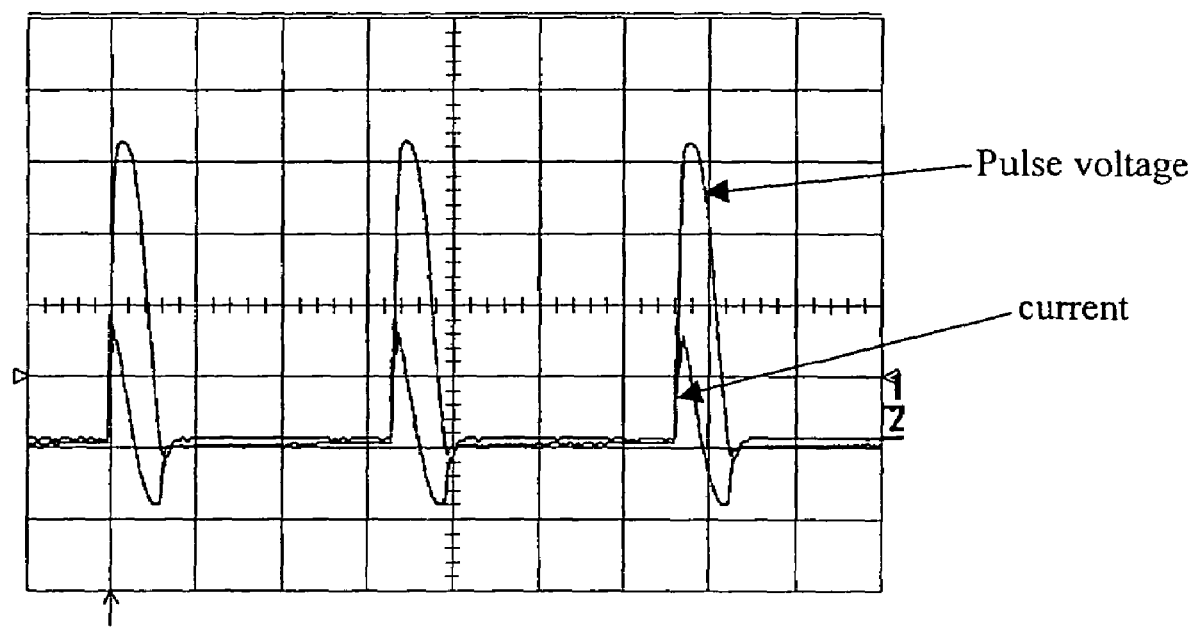
FIG. 2 is a wave diagram of the conventional single-pulse voltage and the current of the cold cathode flat fluorescent lamp.
Figure 3:
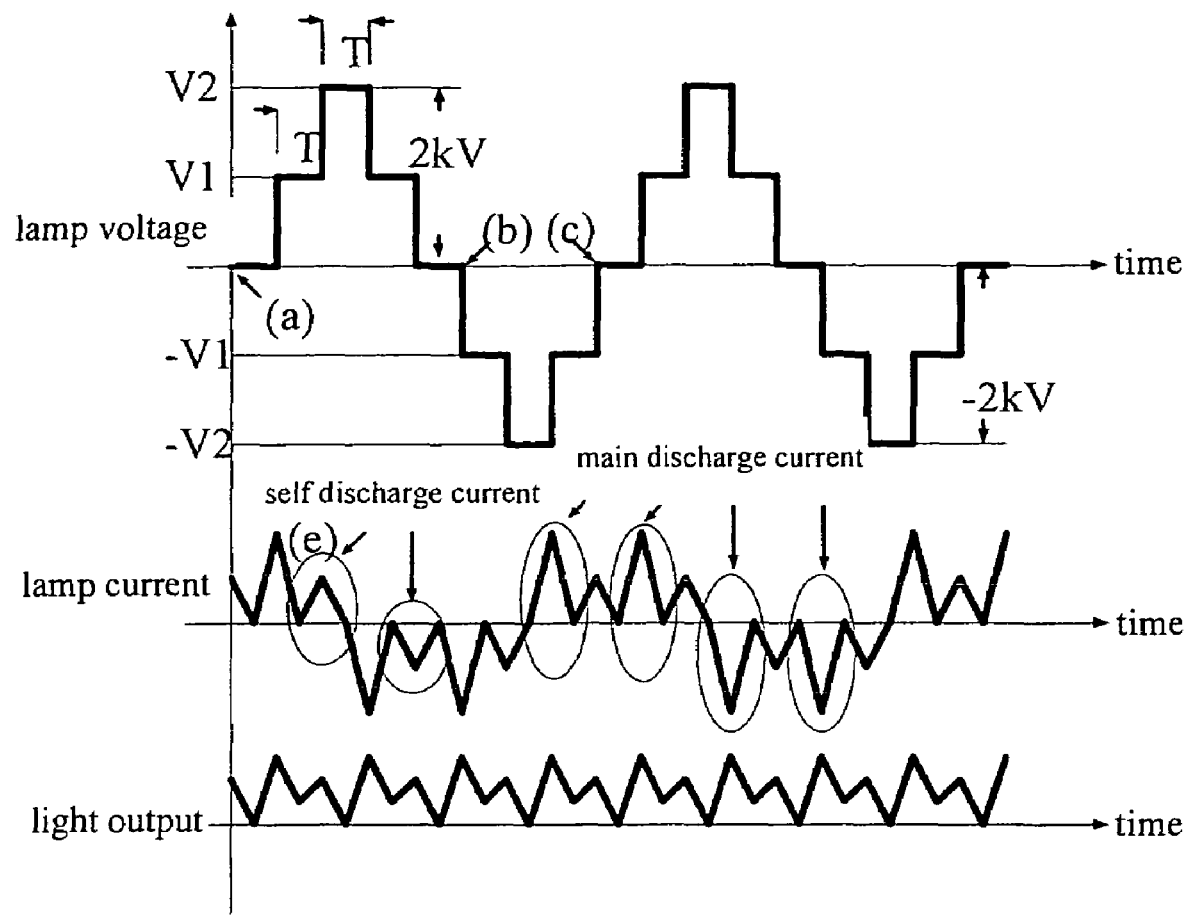
FIG. 3 shows the time sequence diagrams of the lamp voltage wave, the lamp current wave and the light output wave of the driving method with the multi-level driving voltage according to a preferred embodiment of the present application.
Figure 5:
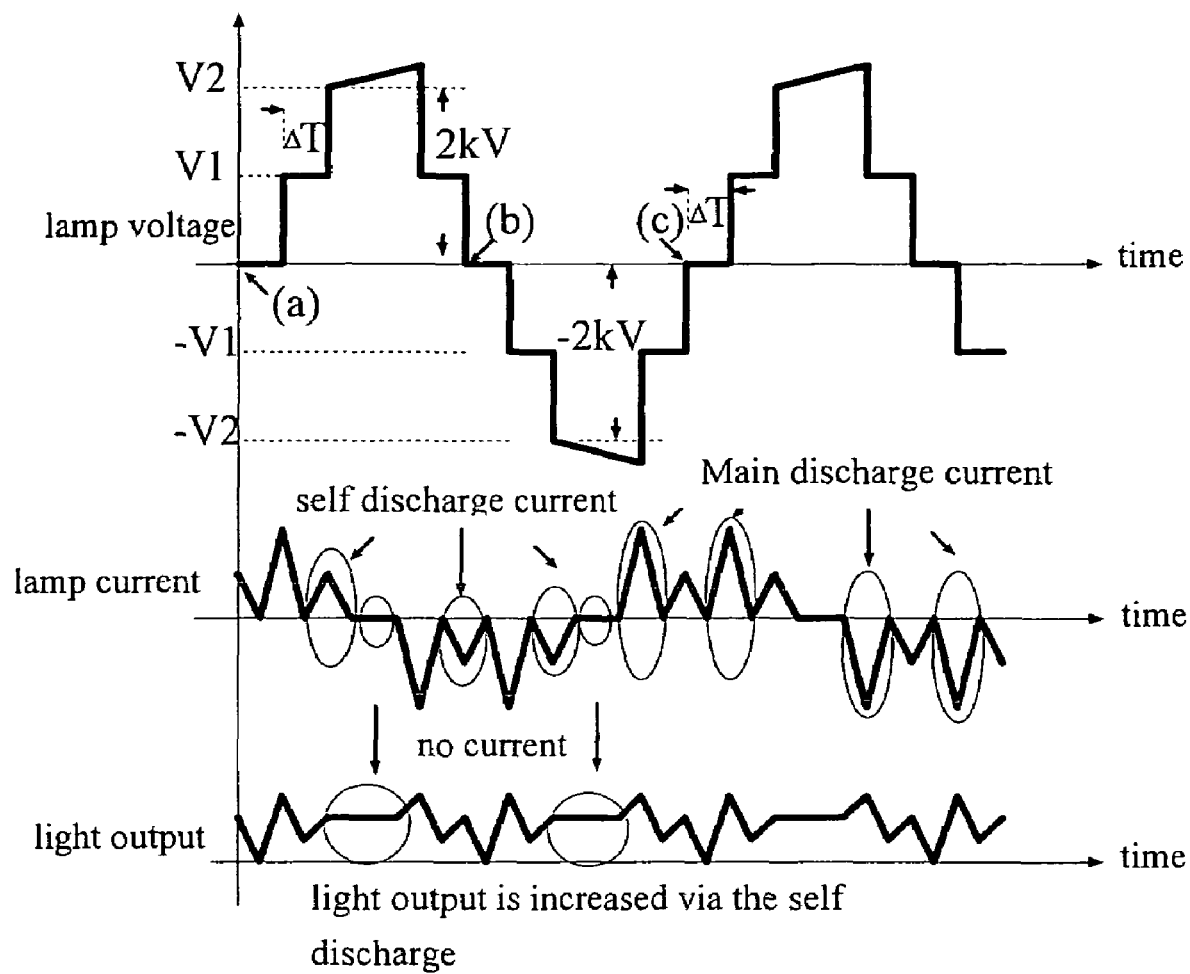
FIG. 5 shows the time sequence diagrams of the lamp voltage wave, the lamp current wave and the light output wave of the driving method with the multi-level driving voltage according to a third preferred embodiment of the present application.

(2) The driving voltages of the present driving method are the multi-level voltages, such as those shown in FIGS. 3 and 5. The driving voltages shown in FIGS. 3 and 5 are two-level voltages, but the driving voltages of the present application are not limited in the two-level voltages. The levels of the driving voltages of the present application can be changed according to the practical demands.

(3) A discharge will occur when the driving voltage is changed from one level to another level, and the discharge is maintained for a period of ΔT to accumulate the wall charges for the next discharge. When the driving voltage drops from one level to another lower level, a self-contained discharge will occur. This is effective to consume the accumulation of the wall charges and increase the output of the light.

(4) During the period of ΔT, when the driving voltage is maintained at a specific level, if the applied voltage is continuously increased or reduced, this increasing voltage will be overcome the voltage of the accumulated wall charges. Therefore, it's possible to continue the discharge without providing an external current and substantially increase the illumination effects of the lamps.

(5) Since the period or frequency of the driving voltage of the present application has the characteristic of the disturbance, the unstable phenomena of plasma will be eliminated and the inference of the EMI will be obviously improved.

(6) The output of the light of the cold cathode flat fluorescent lamp according to the present application is adjusted by controlling the ratio of the switching-on period to the switching-off period.

Please refer to FIG. 3, which shows the time sequence diagrams of the lamp voltage wave, the lamp current wave and the light output wave of the driving method with the multi-level driving voltage according to a preferred embodiment of the present application.

The cold cathode flat fluorescent lamp (CCFFL) includes at least two electrodes. It's necessary to apply a driving voltage to the CCFFL so as to drive it. The first distinguish between the driving method of the present application and those of the prior arts, however, is that the electrodes of the CCFFL in the present application is driven by applying a stacked wave voltage thereto.

When a CCFFL includes two electrodes, a first electrode and a second electrode, according to the physical meanings, the control method for the driving method of the present application includes two stages. In the first stage, the original voltage of the second electrode is taken as a reference voltage, and then the original voltage of the first electrode is increased to a first value by a rate. After that, the increased voltage of the first electrode is maintained at the first value for a period. Then, the voltage of the first electrode is furthermore increased to a second value and maintained at the second value for a period. The above increasing and maintaining steps will be repeated for several times until the voltage of the first electrode achieves a relatively extreme. Next, the voltage of the first electrode is reduced from the relatively extreme back to its original value according to the reducing and maintaining steps inverse to the above increasing and maintaining steps. In the second stage, however, the original voltage of the first electrode is taken as a reference voltage, and then the original voltage of the second electrode is increased to a relatively extreme and then reduced to its original voltage. However, it should be noted that the above process is taken as an example only, and it is certainly practicable to take the original voltage of the first electrode as a reference voltage in the first stage and take the original voltage of the second electrode as a reference voltage in the second stage. As above, the driving method of the present application refers to the method of taking the original voltage of one of the two electrodes as a reference voltage in the first stage and then taking the original voltage of the other electrode as a reference voltage in the second stage, and no matter which one original voltage of the two electrodes is firstly taken as a reference, the above driving method all works.

When a stacked-wave voltage is applied to a first electrode and the voltage of a second electrode is taken as a reference voltage, the relevant voltage waves are shown in the upper lamp voltage wave of FIG. 3.

With regard to the first electrode, the voltage of the first electrode is first increased from an original value (point "a") to a relatively extreme (about 2 kV), and then is reduced back to its original value (point "b").

After that, the original voltage of the first electrode is taken as a reference voltage, and the voltage of the second electrode is increased from an original value to a relatively extreme 2 kV (it is tantamount to main the voltage of the second electrode but reduce the voltage of the first electrode from its original value to a relatively extreme −2 kV from the view of the voltage wave of the first electrode) and then is reduced back to its original value (it is tantamount to main the voltage of the second electrode but increase the voltage of the first electrode from the relatively extreme −2 kV back to its original value from the view of the voltage wave of the first electrode) according to a same method of that of the first electrode.

It should be noted that the driving method according to the present application may just include one increasing step and one reducing step, and, it's also possible to include the plurality of increasing steps and reducing steps as that shown in FIG. 3. However, it's the key to control the increasing and reducing rates, because the voltage value of the dielectric layer is not the key but the increasing and reducing rates thereof are the key factors during the discharging mechanism thereof.

In general, if the voltage of an electrode is slowly increased (or reduced) to the relatively extreme 2 kV (or −2 kV) by only one increasing (or reducing) step, the discharge will only occur after the voltage of the electrode has achieved to the relatively extreme 2 kV (or −2 kV). However, if the voltage of an electrode is increased (reduced) by a two-step manner with the increasing (or reducing) rate equal to or greater than 9.3 V/μs, as that shown in FIG. 3, the discharge might occur when the voltage still does not achieve to the relatively extreme 2 kV (or −2 kV). Of course, it should be known that the voltage of the electrode might be increased (or reduced) by a multi-step increasing (or reducing) method.

As above, the wall charges accumulated on the two electrodes will be ably removed by inputting the half-wave voltage to the two electrodes by turns. Thereby, the consumption power and the temperature of the panel will be reduced accordingly, and the illumination thereof will be significantly increased accordingly. However, during the conventional driving process, when a single-pole voltage is input to the cold cathode flat fluorescent lamp, the wall charges are always accumulated on the electrodes with the opposite polarity of that of the input single-pole wave. Furthermore, if the accumulated wall charges are not removed, the input voltage will be necessarily increased gradually. Nevertheless, according to the driving method of the present application, since a bipolar voltage is input to the cold cathode flat fluorescent lamp, the wall charges accumulated on the electrodes will always be ably removed while the voltage polarity of the input voltage changes from one pole to another pole. Therefore, the driving voltage of the present application will not be necessarily increased accordingly. To sum up, the driving method of the present application does have the progressiveness and utility when compared with the conventional driving method.

The second technical feature of the present application different from those of the prior arts is that, in the present application, the voltage of the lamp is maintained for a period when it achieves a desired value after being increased or reduced.

Please refer to FIG. 3, the voltage of the lamp will always be maintained at a value for a period $\Delta T$ (0.3–2.0 μs) after being increased or reduced so as to make the wall charges stably accumulate on the electrodes and the following discharge could be performed completely.

Since there exists the maintaining period $\Delta T$, the lamp will not only have the main discharge current resulted from the increase of the voltage but also the increased self discharge current induced by itself additional discharge. Accordingly, with the two-stage increasing step of increasing voltage, the discharge current of the lamp is reduplicated and the light output is also reduplicated. Therefore, the illumination of the cold cathode flat fluorescent lamp driven by the method according to the present application is higher than that of the prior art, and the efficiency thereof is also greater than that of the prior art.

Figure 4:
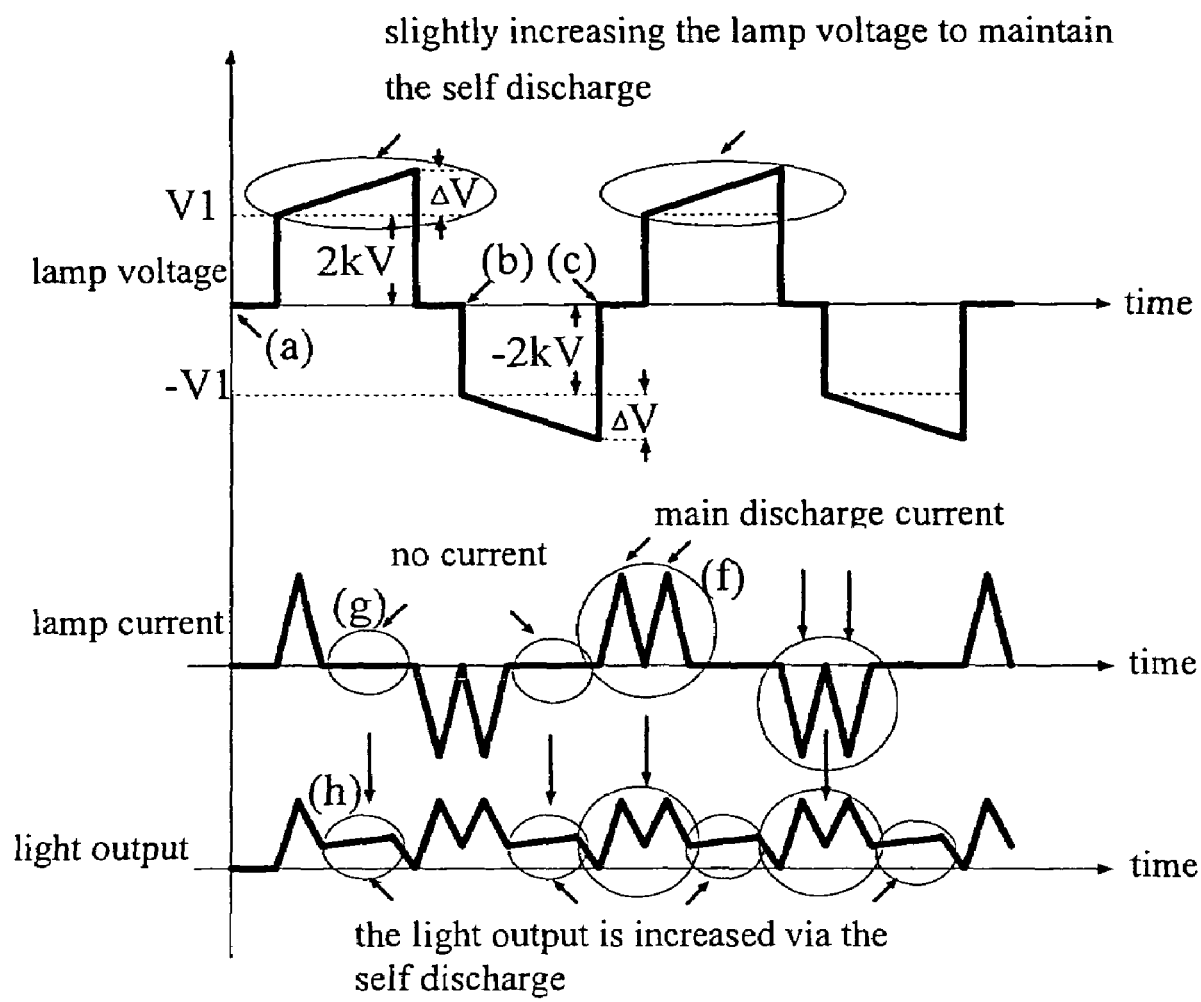
FIG. 4 shows the time sequence diagrams of the lamp voltage wave, the lamp current wave and the light output wave of the driving method with the multi-level driving voltage according to a second preferred embodiment of the present application.

Please refer to FIG. 4, which shows the time sequence diagrams of the lamp voltage wave, the lamp current wave and the light output wave of the driving method with the multi-level driving voltage according to a second preferred embodiment of the present application. As shown in FIG. 4, the third technical feature of the present application different from those of the prior arts is that, during the driving method according to the present application, when the bipolar voltage is input into the cold cathode flat fluorescent lamp, the voltage of the lamp can be modulated in the gradually increasing form with 50–200 Volt or the gradually reducing form with 50–200 Volt after it achieves its original highest and the lowest values so as to sustain discharge and increase the illumination and the efficiency of the lamp.

As shown in FIG. 4, although there exists the main discharge current resulting from the increase of the voltage (point "f"), there is no lamp current (point "g") when the voltage is maintained at a relative extreme for a period. However, the light output thereof is increased (zone "h"). As above, it is found that the area between the light output wave and the X axis is increased, i.e. the light output in zone "h", by the method of modulating the voltage in the gradually increasing form or the gradually reducing form.

Please refer to FIG. 5, which shows the time sequence diagrams of the lamp voltage wave, the lamp current wave and the light output wave of the driving method with the multi-level driving voltage according to a third preferred embodiment of the present application. The multi-level driving voltage according to the third preferred embodiment of the present application includes the above three technical features.

The fourth technical feature of the present application different from those of the prior arts is that, during the driving method according to the present application, the driving frequency of the cold cathode flat fluorescent lamp is maintained within a specific range around the main frequency thereof.

Figure 6:
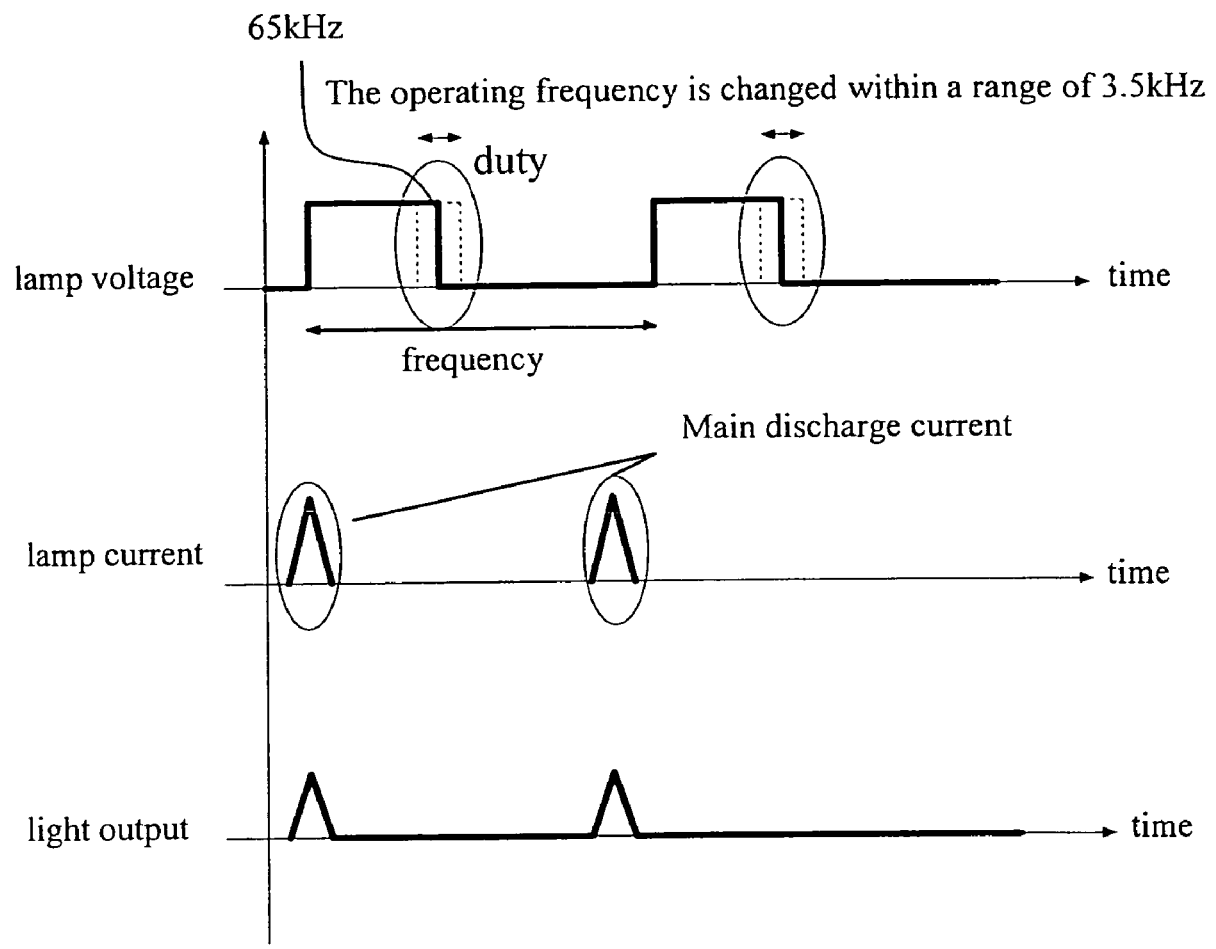
FIG. 6 shows the time sequence diagrams of the lamp voltage wave, the lamp current wave and the light output wave of the driving method with less EMI according to a preferred embodiment of the present application.

In general, the driving voltage of the cold cathode flat fluorescent lamp is always relatively high (over 1 kV), especially in the flat lamp without the argon, and the main operating frequency is always in the range from 30 kHz to 90 kHz. However, the acoustic resonance is easily introduced when the operating frequency is in the range from 30 kHz to 90 kHz, so that the illumination of the lamp might be unstable. In addition, since the operation is always under a relatively high voltage, the inference of EMI becomes serious issue. In order to solve the above problems, the present application provides a new driving method of controlling the operating frequency, and the relevant frequency perturbation is illustrated in FIG. 6. As shown in FIG. 6, taking the main operating frequency being 65 kHz as an example, and the practical driving voltage frequency will be usually maintained in the range from 60 kHz to 70 kHz, preferably in the range from 62 kHz to 68 kHz. However, since the operating frequency is not maintained at a constant value, the acoustic resonance will be eliminated therefor and the inference of EMI will also be reduced accordingly.

The fifth technical feature of the present application different from those of the prior arts is that, during the driving method according to the present application, the Pulse-width Modulation (PWM) technology is applied to modulate the light output, i.e. the light output is modulated by controlling the duty of switching-on time to switching-off time of the lamp.

Figure 7:
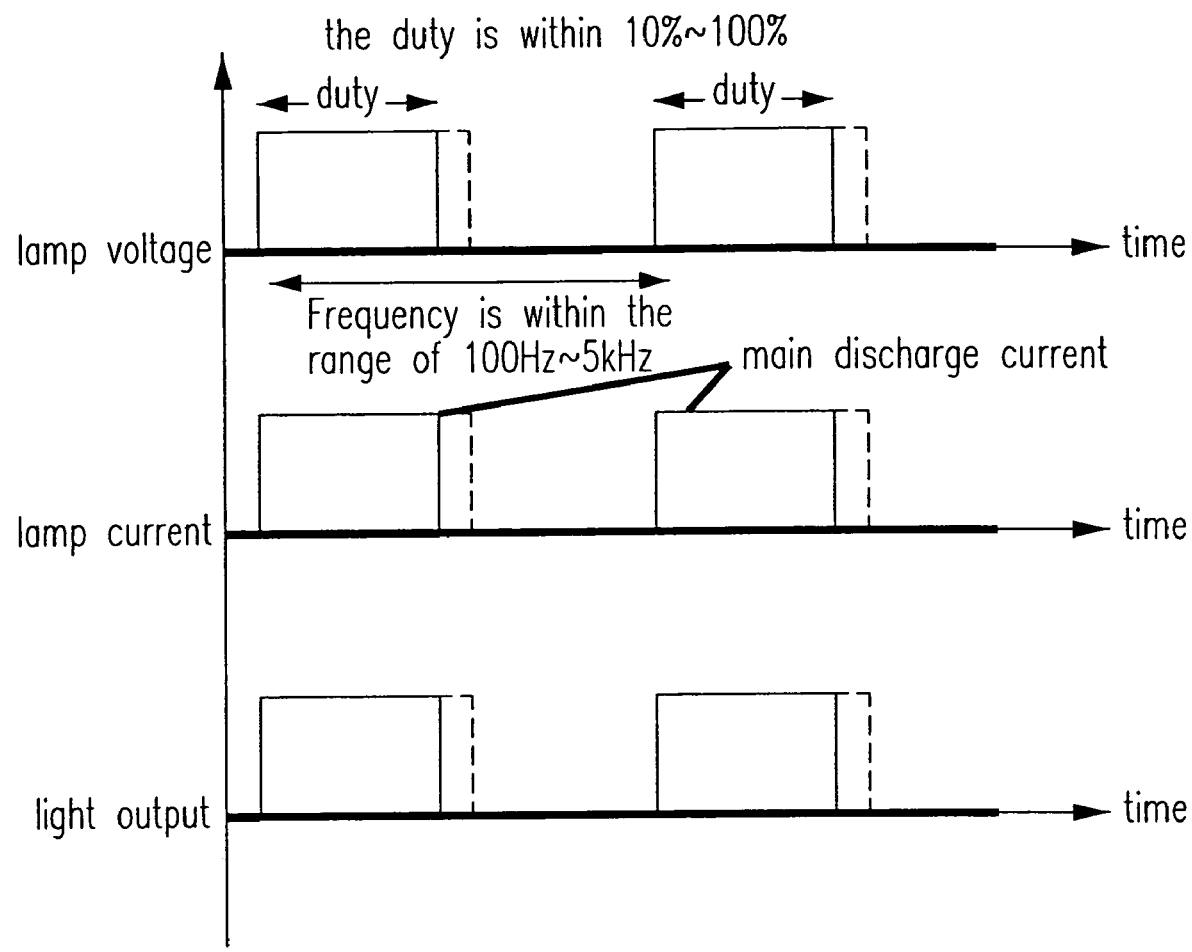
FIG. 7 shows the time sequence diagrams of the lamp voltage wave, the lamp current wave and the light output wave of the driving method with the duty of switching-on time to switching-off time thereof according to a preferred embodiment of the present application.
Figure 8:
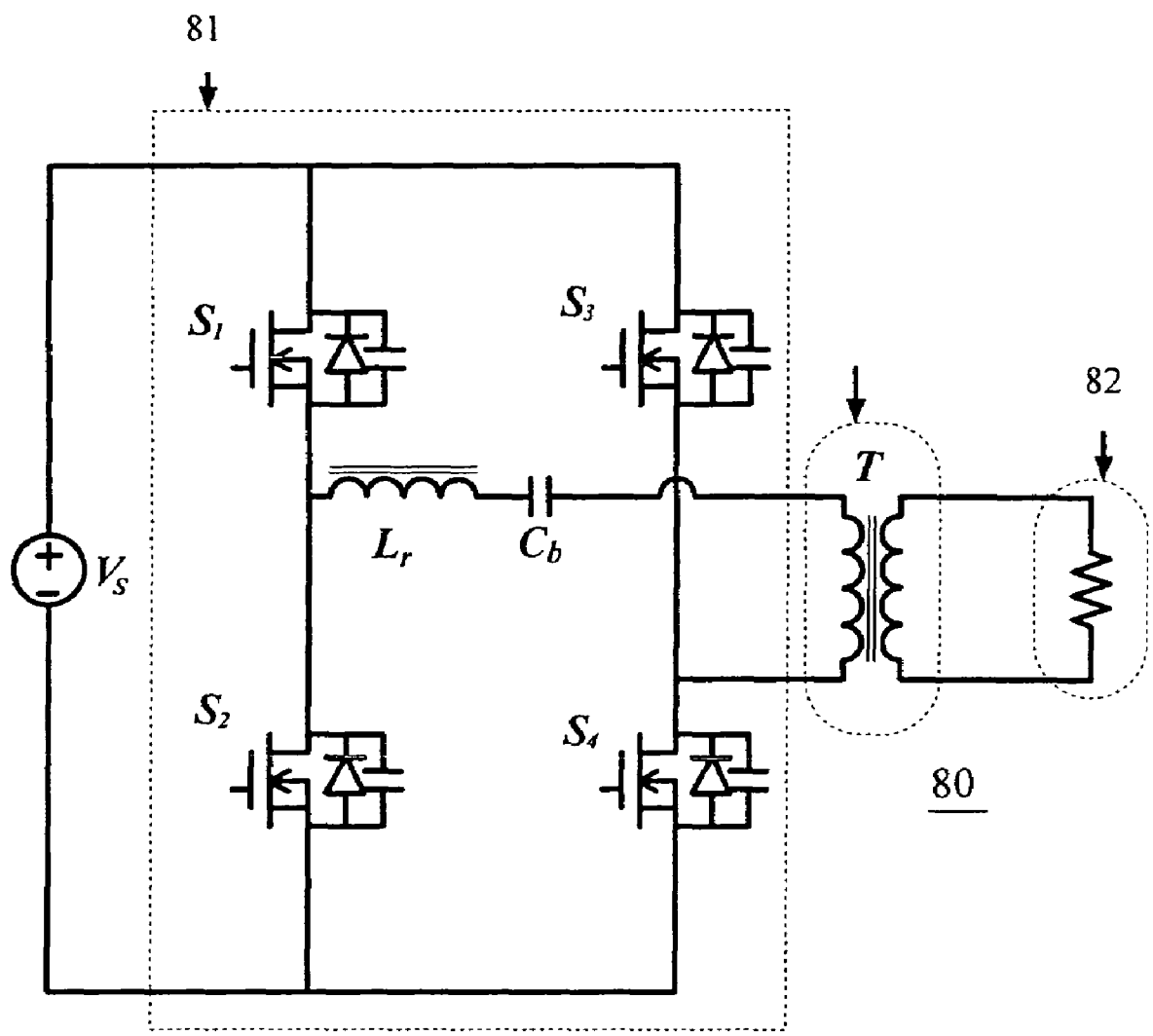
FIG. 8 is a circuit diagram for a cold cathode flat fluorescent lamp according to a preferred embodiment of the present application.

Please refer to FIG. 7, which is the time sequence diagrams of the lamp voltage wave, the lamp current wave and the light output wave of the driving method according to a preferred embodiment of the present application. As shown in FIG. 7, although the ultraviolet is pulsating, the phosphor powder of lamp and the optical filter of the backlight module will reduce the pulsation of the final light output to be invisible. And, the light output and the power of the lamp can be significantly reduced accordingly, Please refer to FIG. 8, which is a circuit diagram for a cold cathode flat fluorescent lamp according to a preferred embodiment of the present application. As shown in FIG. 8, the cold cathode flat fluorescent lamp 80 includes the ballast 81, the lamp 82 (indicated by the resistance) and the high voltage transformer T. The two ends of the lamp 82 are respective the first electrode and the second electrode, and the ballast 81 is composed of a full-bridge circuit formed by the four coupled metal oxide semiconductor field effect transistor (MOSFET) or of an insulated gate bipolar transistor (IGBT) S1, S2, S3 and S4, the resonance inductor Lr and the blocking capacitor Cb. In addition, the full-bridge circuit is further connected to an input voltage Vs.

According to the structure in FIG. 8, it is possible to input the above voltage waves, the lamp current waves and the light output waves to the lamp 82 via the high voltage transformer T by properly switching the various switches in the full-bridge circuit in the ballast 81. Of course, the circuit diagram in FIG. 8 is just an embodiment, and one skilled in the art can easily modify it to obtain various other circuits for achieving the same efficiency. It should be noted that no matter what is the circuit structure obtained from modifying the above embodiment, its controlling method and driving method will still be within the spirit and scopes of the present application.

As above, based on the driving method or the cold cathode flat fluorescent lamp according to the present application, the full illumination of the relevant lamp will be achieved by controlling the glow discharge. In addition, in co-ordination with the stacked-wave driving voltage and the relevant control conditions, the light output efficiency of the cold cathode flat fluorescent lamp will be increased, the operation temperature thereof could be controlled within the desired range accordingly. Furthermore, the EMI effect will be reduced by the perturbation of the driving voltage frequency. To sum up, the advantages of the present application include that the illumination efficiency of the relevant lamp is increased, the lamp temperature is reduced, the illumination of the lamp can be modulated and the EMI effect is reduced. However, since the cold cathode flat fluorescent lamp according to the present application and the driving method thereof have all the above advantages, the present application does have the progressiveness, novelty and industrial utility.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claim is:

1. A method for driving a cold cathode flat fluorescent lamp having at least a first electrode having a first voltage and a second electrode having a second voltage, comprising steps of:
    (a) increasing said first voltage to a first increased voltage with a first rate according to said second voltage;
    (b) maintaining said first increased voltage for a first period;
    (c) repeating said steps (a) and (b) at least once to achieve a relatively extreme voltage;

(d) reducing said relatively extreme voltage with said first rate to a first reduced voltage;
(e) maintaining said first reduced voltage for said first period;
(f) repeating said steps (d) and (e) at least once for said first electrode to achieve said first voltage;
(g) increasing said second voltage to a second increased voltage with a second rate according to said first voltage;
(h) maintaining said second increased voltage for a second period;
(i) repeating said steps (g) and (h) at least once to achieve said relatively extreme voltage;
(j) reducing said relatively extreme voltage with said second rate;
(k) maintaining said second reduced voltage for said second period;
(l) repeating said steps (j) and (k) at least once for said second electrode to achieve said second voltage.

2. The method according to claim 1, wherein said first rate and said second rate are equal to or greater than 9.3 V/ps.

3. The method according to claim 1, wherein said first period and said second period are in a range of 0.3 to 2 microseconds.

4. The method according to claim 1, wherein said relatively extreme voltage is 2000 volts.

5. The method according to claim 1, wherein said steps (c) and (i) further comprise a step of increasing said relatively extreme voltage with a voltage difference.

6. The method according to claim 5, wherein said voltage difference is ranged from 50 V to 200 V.

7. The method according to claim 1, wherein said cold cathode flat fluorescent lamp has a driving frequency to be controlled within a range from 25 to 95 kHz.

8. The method according to claim 1 further comprising a step of adjusting an output of said cold cathode flat fluorescent lamp by controlling a duty of switching-on to switching-off of said first and second voltages.

9. cold cathode flat fluorescent lamp, comprising:
a lamp having at least a first electrode having a first voltage and a second electrode having a second voltage;
a transformer having a first side and a second side; and
a full-bridge circuit for driving said lamp with said method according to claim I,
wherein said transformer is connected to said lamp on said first side and is connected to said full-bridge circuit on said second side.

10. The cold cathode flat fluorescent lamp according to claim 9, wherein said full-bridge circuit is coupled to said transformer via a resonance inductor and a capacitor.

11. The cold cathode flat fluorescent lamp according to claim 9, wherein said full-bridge circuit is coupled to an input voltage.

12. The cold cathode flat fluorescent lamp according to claim 9, wherein said full-bridge circuit is made of a metal oxide semiconductor field effect transistor.

13. The cold cathode flat fluorescent lamp according to claim 9 comprising a driving frequency to be controlled within a range by said full-bridge circuit.

14. The cold cathode flat fluorescent lamp according to claim 9, wherein said full-bridge circuit controls a duty of switching-on to switching-off of said first and second voltages so as to adjust an output of said cold cathode flat fluorescent lamp.

15. A method for driving a cold cathode flat fluorescent lamp having at least a first electrode having a first voltage and a second electrode having a second voltage, comprising steps of:
(increasing said first voltage to a first increased voltage with a first rate according to said second voltage and
(maintaining said first increased voltage for a first period.

16. The method according to claim 15, further comprising a step of (c) repeating said steps (a) and (b) at least once to achieve a relatively extreme voltage.

17. The method according to claim 16, further comprising a step of (d) reducing said relatively extreme voltage with said first rate to a first reduced voltage.

18. The method according to claim 17, further comprising a step of (e) maintaining said first reduced voltage for said first period.

19. The method according to claim 18, further comprising a step of (repeating said steps (d) and (e) at least once for said first electrode to achieve said first voltage.

20. The method according to claim 19, further comprising a step of (g) increasing said second voltage to a second increased voltage with a second rate according to said first voltage.

21. The method according to claim 20, further comprising a step of (h) maintaining said second increased voltage for a second period.

22. The method according to claim 21, further comprising a step of (i) repeating said steps (g) and (h) at least once to achieve said relatively extreme voltage.

23. The method according to claim 22, wherein said steps of (c) and (i) further comprise a step of increasing said relatively extreme voltage with a voltage difference.

24. The method according to claim 23, further comprising a step of (reducing said relatively extreme voltage with said second rate.

25. The method according to claim 24, further comprising a step of (k) maintaining said second reduced voltage for said second period.

* * * * *